(12) United States Patent
Robillard et al.

(10) Patent No.: US 10,922,078 B2
(45) Date of Patent: Feb. 16, 2021

(54) HOST PROCESSOR CONFIGURED WITH INSTRUCTION SET COMPRISING RESILIENT DATA MOVE INSTRUCTIONS

(71) Applicant: EMC IP Holding Company LLC, Hopkinton, MA (US)

(72) Inventors: Michael Robillard, Shrewsbury, MA (US); Adrian Michaud, Carlisle, MA (US); Dragan Savic, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/444,577

(22) Filed: Jun. 18, 2019

(65) Prior Publication Data

US 2020/0401404 A1 Dec. 24, 2020

(51) Int. Cl.
 *G06F 9/30* (2018.01)
 *G06F 3/06* (2006.01)

(52) U.S. Cl.
 CPC ........ *G06F 9/30032* (2013.01); *G06F 3/0604* (2013.01); *G06F 3/0647* (2013.01); *G06F 3/0673* (2013.01)

(58) Field of Classification Search
 None
 See application file for complete search history.

(56) References Cited

U.S. PATENT DOCUMENTS

| 5,442,747 A | 8/1995 | Chan et al. | |
|---|---|---|---|
| 6,952,181 B2 * | 10/2005 | Karr | G01C 21/206 342/457 |
| 7,318,115 B2 * | 1/2008 | Kanapathippillai | G06F 1/3203 711/5 |
| 10,140,052 B2 * | 11/2018 | Williams | G06F 12/10 |
| 10,152,322 B2 * | 12/2018 | Frey | G06F 9/30032 |
| 10,331,373 B2 * | 6/2019 | Guthrie | G06F 3/0673 |
| 2003/0212997 A1 * | 11/2003 | Hejna, Jr. | H04N 21/47202 725/88 |
| 2005/0044342 A1 | 2/2005 | Wilson | |

(Continued)

OTHER PUBLICATIONS

Kevin Marks, "An NVM Express Tutorial," Flash Memory Summit, 2013, 92 pages.

(Continued)

*Primary Examiner* — Michael Sun
(74) *Attorney, Agent, or Firm* — Ryan, Mason & Lewis, LLP

(57) ABSTRACT

A system includes a host processor and at least one storage device coupled to the host processor. The host processor is configured to execute instructions of an instruction set, the instruction set comprising a first move instruction for moving data identified by at least one operand of the first move instruction into each of multiple distinct storage locations. The host processor, in executing the first move instruction, is configured to store the data in a first one of the storage locations identified by one or more additional operands of the first move instruction, and to store the data in a second one of the storage locations identified based at least in part on the first storage location. The instruction set in some embodiments further comprises a second move instruction for moving the data from the multiple distinct storage locations to another storage location.

20 Claims, 5 Drawing Sheets

(56) References Cited

U.S. PATENT DOCUMENTS

| | | | |
|---|---|---|---|
| 2006/0101130 A1* | 5/2006 | Adams | H04L 67/327 |
| | | | 709/218 |
| 2006/0195801 A1 | 8/2006 | Iwamura | |
| 2010/0114360 A1* | 5/2010 | Starr | G11B 15/689 |
| | | | 700/214 |
| 2013/0275699 A1 | 10/2013 | Cheriton | |
| 2013/0339672 A1* | 12/2013 | Jacobi | G06F 9/30076 |
| | | | 712/220 |
| 2014/0365707 A1 | 12/2014 | Talagala et al. | |
| 2015/0032975 A1 | 1/2015 | Ruberg et al. | |
| 2017/0185645 A1 | 6/2017 | Agarwal et al. | |
| 2017/0269956 A1 | 9/2017 | Shacham et al. | |
| 2017/0351452 A1 | 12/2017 | Boyd et al. | |
| 2018/0018171 A1 | 1/2018 | Amidi et al. | |
| 2018/0095884 A1* | 4/2018 | Kaminski | G06F 12/0868 |
| 2019/0004940 A1 | 1/2019 | Boyd et al. | |
| 2019/0149341 A1 | 5/2019 | Robison et al. | |

OTHER PUBLICATIONS

NVM Express, "NVMe Specification," Revision 1.3, May 1, 2017, 282 pages.

U.S. Appl. No. 15/956,309 filed in the name of Adrian Michaud filed Apr. 18, 2018 and entitled "Storage System with Binding of Host Non-Volatile Memory to One or More Storage Devices."

* cited by examiner

```
movzd [ebx], eax ; Move the 4 bytes in EAX to the address contained in EBX
                 ; Move the 4 bytes in EAX to the address contained in EBX+ESI
```

FIG. 4A

```
movzd eax, [ebx] ; Load the 4 bytes in memory at the address contained in EBX into a hidden register
                 ; Load the 4 bytes in memory at the address contained in EBX+ESI into a hidden register
                 ; Compare the contents of the 2 hidden registers
                 ; If they agree, map one of the hidden registers to EAX, discard the other
                 ; If they do not agree, raise an application level exception
```

FIG. 4B

HOST PROCESSOR CONFIGURED WITH INSTRUCTION SET COMPRISING RESILIENT DATA MOVE INSTRUCTIONS

FIELD

The field relates generally to information processing systems, and more particularly to host processors and associated storage devices in information processing systems.

BACKGROUND

Information processing systems are increasingly utilizing high performance non-volatile memory to implement storage services accessible to host processors. For example, such systems can be configured for direct attachment of newly-developed persistent memory (PMEM) or storage class memory (SCM) devices. These devices promise significant improvements in terms of increased durability and lower latency. Unfortunately, host processors are often not suitably configured to take full advantage of the enhanced functionality offered by such devices. This deficiency can be attributed in some cases to the limited instruction sets available in the host processors.

SUMMARY

Illustrative embodiments provide resilient data move instructions as part of an instruction set of a host processor. These move instructions, in some embodiments, are configured to support enhanced data resiliency in a particularly efficient manner. For example, such embodiments can allow the host processor to better exploit the enhanced functionality of advanced PMEM and SCM devices.

In one embodiment, a system includes a host processor and at least one storage device coupled to the host processor. The host processor is configured to execute instructions of an instruction set, the instruction set comprising a first move instruction for moving data identified by at least one operand of the first move instruction into each of multiple distinct storage locations. The host processor, in executing the first move instruction, is configured to store the data in a first one of the storage locations identified by one or more additional operands of the first move instruction, and to store the data in a second one of the storage locations identified based at least in part on the first storage location.

The instruction set in some embodiments further comprises a second move instruction for moving the data from the multiple distinct storage locations to another storage location.

As indicated above, the first and second move instructions in illustrative embodiments advantageously provide enhanced data resiliency in a particularly efficient manner.

These and other illustrative embodiments include, without limitation, apparatus, systems, methods and computer program products comprising processor-readable storage media.

BRIEF DESCRIPTION OF THE DRAWINGS

FIGS. 4A and 4B show examples of resilient data move instructions for respectively moving data from a register to memory and moving data from memory to a register.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, cloud-based systems, as well as other types of storage systems comprising various combinations of physical and virtual processing resources. Information processing systems as disclosed herein can therefore be implemented as enterprise systems, cloud-based systems, or in other configurations. A given such information processing system can include compute nodes or other types of processing devices that utilize an underlying storage system comprising one or more storage devices.

Figure 1:
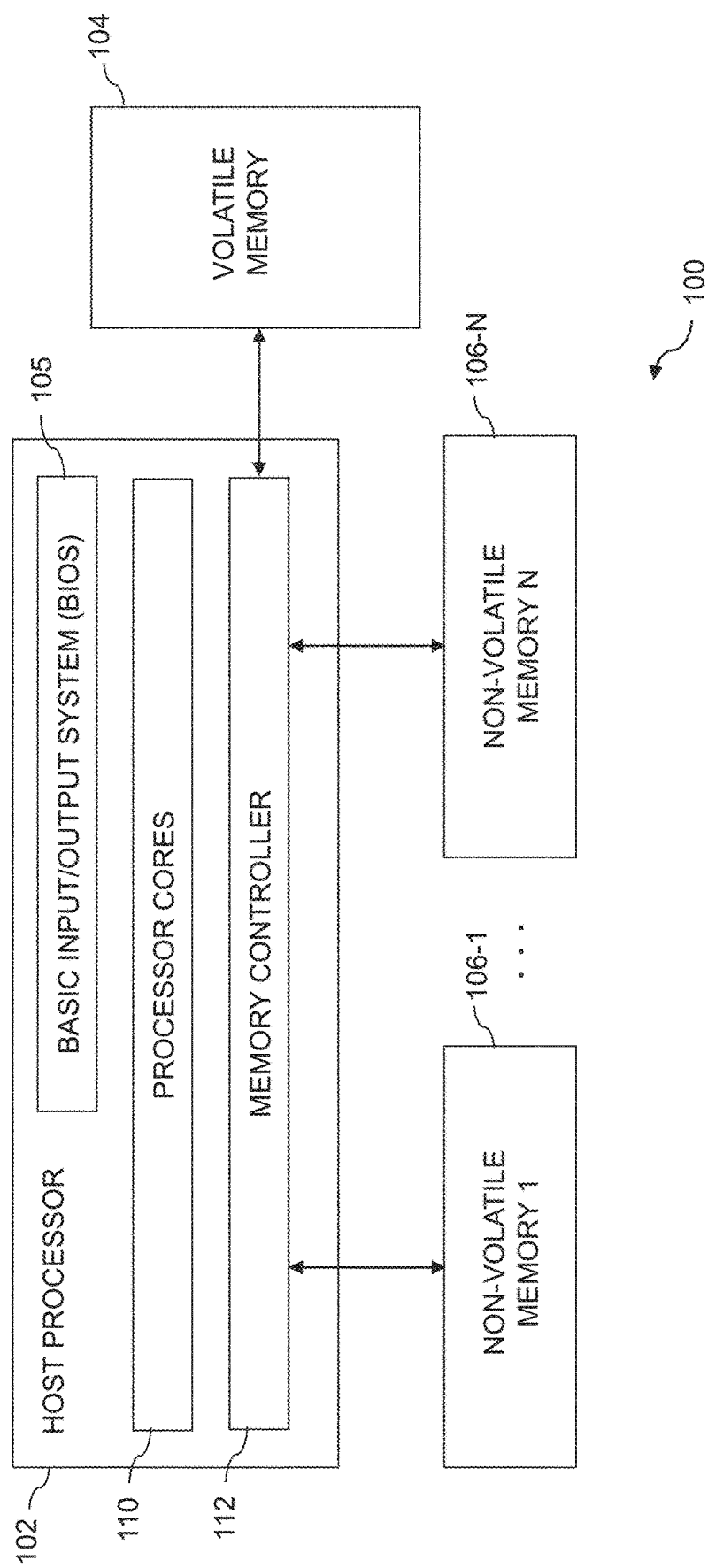
FIG. 1 is a block diagram of an information processing system having a host processor configured for execution of resilient data move instructions in an illustrative embodiment.

FIG. 1 shows an information processing system 100 configured in accordance with an illustrative embodiment. The system 100 comprises a host processor 102, a volatile memory 104 coupled to the host processor 102, and a plurality of storage devices each also coupled to the host processor 102. The storage devices in this embodiment are illustratively implemented as respective Non-Volatile Memory (NVM) devices 106-1 through 106-N, also denoted in the figure as Non-Volatile Memory 1 through Non-Volatile Memory N. These NVM devices 106 in some embodiments comprise PMEM or SCM devices. Other types of storage devices can be used in other embodiments, and the term "storage device" as used herein is intended to be broadly construed. For example, such storage devices can include respective memory-addressable storage devices of various types.

The host processor 102 further comprises Basic Input/Output System (BIOS) 105, processor cores 110, and a memory controller 112. Those skilled in the art will appreciate that the host processor 102 can include additional or alternative components of a type commonly found in such a host processor.

The volatile memory 104 and the NVM devices 106 share the memory controller 112 of the host processor 102. Other arrangements are possible. For example, the volatile memory 104 may be coupled to the memory controller 112 with the NVM devices 106 being coupled to a memory bus interface rather than directly to the memory controller 112 as illustrated in the FIG. 1 embodiment. Each of the NVM devices 106 can also include a separate internal controller, although such components are not explicitly shown in the figure, for clarity and simplicity of illustration.

The host processor 102 may comprise a central processing unit (CPU) or other type of processor implemented in a server, computer or other processing device. The host processor 102 may be part of physical infrastructure that is utilized to implement virtual machines, containers or other virtual processing devices.

The NVM devices 106 may be part of a storage area network (SAN) or other type of network of the system 100. In some embodiments, data transfer in the system 100 can utilize techniques such as remote direct memory access (RDMA) connections over InfiniBand or Gigabit Ethernet. Numerous other types of connections and associated data transfer protocols can be used in other embodiments.

Although the volatile memory 104 is shown as separate from the host processor 102 in the FIG. 1 embodiment, in other embodiments the volatile memory 104 may be at least partially incorporated into the host processor 102. Accordingly, a volatile memory associated with a host processor in a given embodiment may comprise an internal volatile memory of the host processor. Numerous other arrangements are possible for volatile memory associated with a given host processor.

The volatile memory 104 of the host processor 102 illustratively comprises dynamic random access memory (DRAM). The use of DRAM in the volatile memory 104 provides the host processor 102 with a very low access times to read and write stored data, typically less than about 20 nanoseconds for both read and write operations. Non-volatile memory such as NAND-based flash memory typically has significantly higher access times, and in some cases may have minimum block size restrictions.

The NVM devices 106 in some embodiments are implemented using memory technologies that exhibit performance capabilities similar to those of DRAM or other types of volatile RAM. Examples of these and other non-volatile alternatives to flash memory that may be utilized to provide at least a portion of the NVM devices 106 include resistive RAM, ferroelectric RAM (FRAM), phase change RAM (PC-RAM), spin-transfer torque magneto-resistive RAM (STT-MRAM) and Intel Optane™ devices based on 3D XPoint™ memory, although other types of memories can be used in other embodiments. Such NVM devices are examples of what is also referred to herein as "high performance" non-volatile memory. These high performance non-volatile memory devices may be viewed as examples of the PMEM and SCM devices referred to elsewhere herein.

It is also possible in other embodiments that the NVM devices 106 can comprise NAND-based flash memory, rather than high performance non-volatile memory of the types mentioned above. For example, the NVM devices 106 can comprise respective flash-based solid state drives (SSDs).

In some embodiments, the NVM devices 106 more particularly comprise NVM Express (NVMe) storage devices, configured to operate in accordance with the NVMe Specification, Revision 1.3, May 2017, which is incorporated by reference herein. Additional or alternative storage protocols such as NVMe over Fabric (NVMeOF) can be utilized in illustrative embodiments.

Although the NVM devices 106 are directly connected to the host processor 102 in the FIG. 1 embodiment, other arrangements are possible. For example, PCIe connections can be used to support communications between the host processor 102 and the NVM devices 106. Alternative embodiments can use alternative types of interfaces such as Serial Attached SCSI (SAS) and Serial ATA (SATA). Again, numerous other interfaces and associated protocols can be used in other embodiments.

Figure 2A:
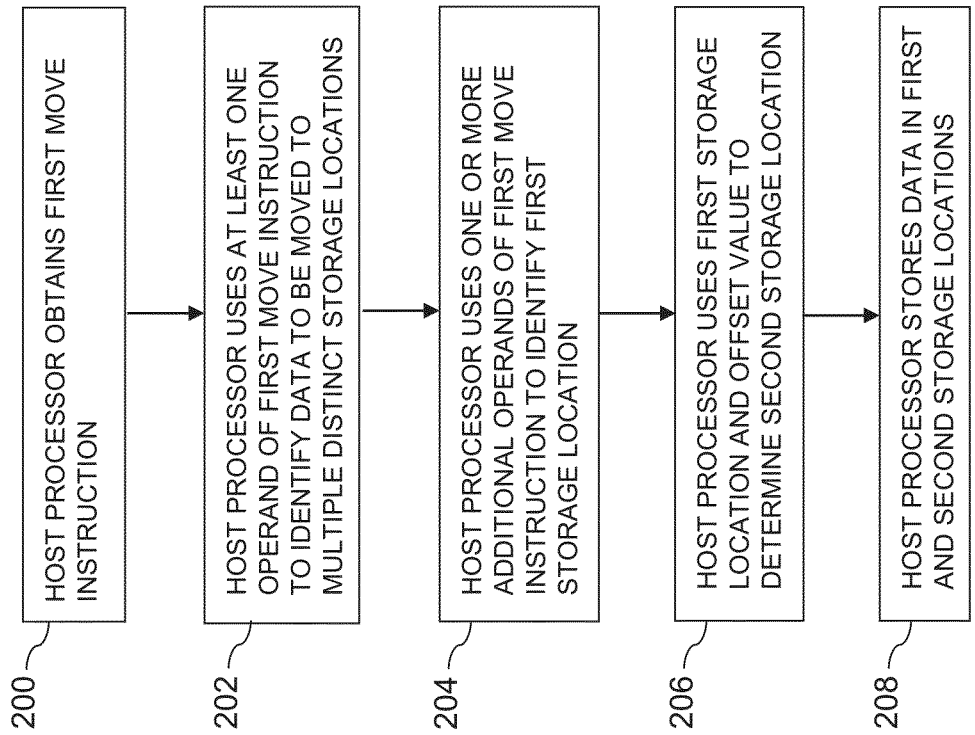
FIGS. 2A and 2B are flow diagrams showing the operation of respective resilient data move instructions in illustrative embodiments.
Figure 2B:
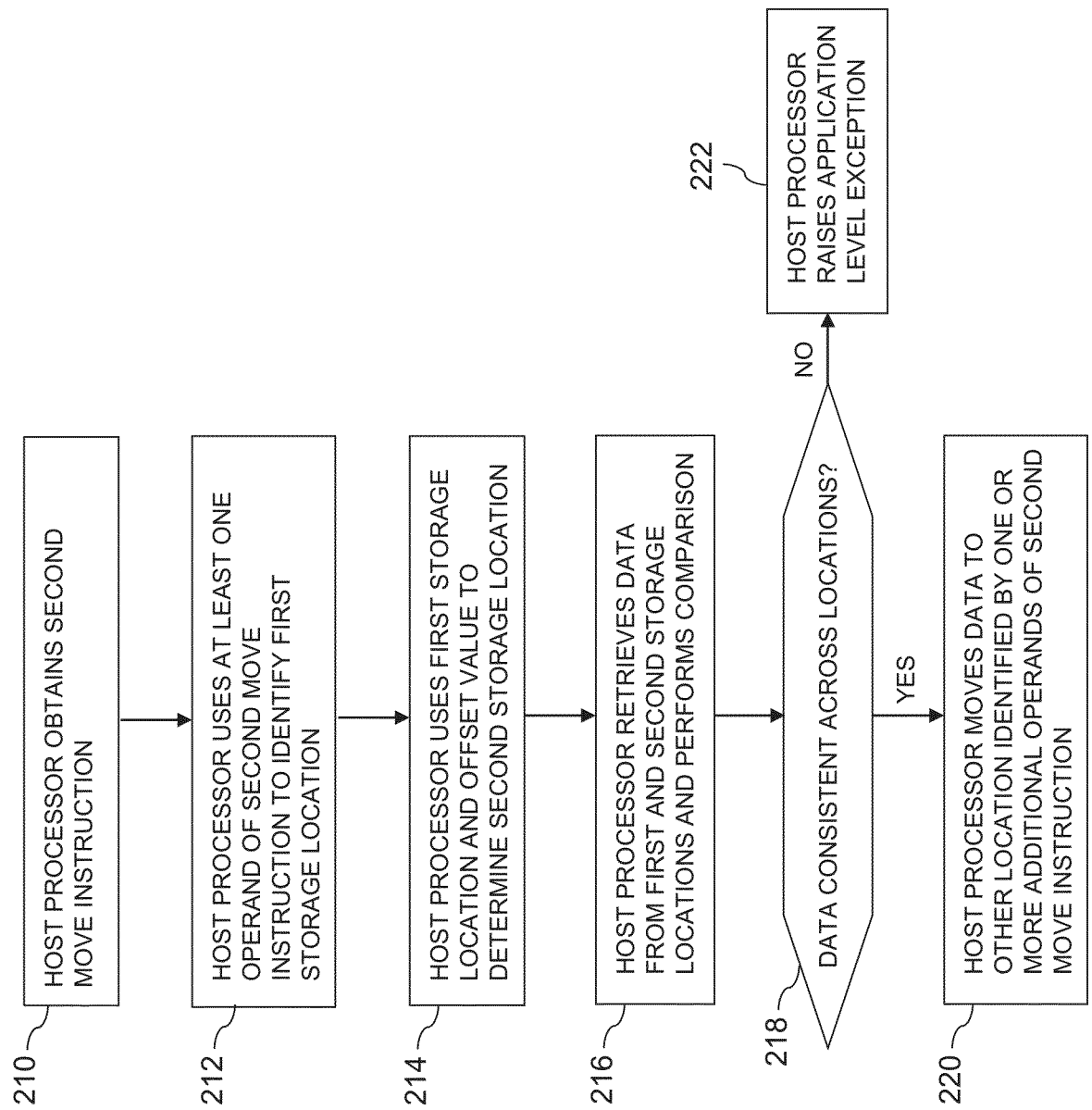

The host processor 102 in the present embodiment is configured with an instruction set that includes resilient data move instructions, as will now be described in more detail. The resilient data move instructions illustratively include at least first and second move instructions of the instruction set of the host processor 102, for respectively moving data from a register to memory and for moving data from memory to a register. The flow diagrams of FIGS. 2A and 2B illustrate the operations associated with execution of the first and second move instructions by the host processor 102 in illustrative embodiments. A more detailed illustration of an example of the first move instruction will be described below in conjunction with FIG. 3. Also, FIGS. 4A and 4B show detailed examples of the respective first and second move instructions, and will be described in more detail below.

It is assumed that the instruction set of the host processor 102, in addition to the first and second move instructions, further comprises additional conventional instructions of types known to those skilled in the art.

In some embodiments, the host processor 102 is configured as a reduced instruction set computer (RISC) device. For example, the host processor 102 can be configured with an instruction set architecture (ISA) that comprises RISC-like micro-operations, possibly with support for hidden registers, but modified to include the above-noted first and second move instructions to support resilient data movement within the system 100. Other types of RISC or RISC-like ISAs may be used.

In other embodiments, the host processor 102 can be configured as a complex instruction set computer (CISC) device. For example, the host processor 102 in such embodiments may comprise an otherwise conventional x86 processor configured with an x86 ISA that is modified to include the above-noted first and second move instructions to support resilient data movement within the system 100. Such CISC devices can also utilize RISC-like micro-operations, possibly with support for hidden registers.

The first move instruction in the present embodiment is configured for moving data identified by at least one operand of the first move instruction into each of multiple distinct storage locations, such as different storage locations in at least one of the NVM devices 106. The host processor 102, in executing the first move instruction, is configured to store the data in a first one of the storage locations identified by one or more additional operands of the first move instruction, and to store the data in a second one of the storage locations identified based at least in part on the first storage location.

It is assumed in this and other embodiments that the host processor 102 comprises a plurality of registers, examples of which will be described below in conjunction with the embodiment of FIG. 3.

The data to be moved by execution of the first move instruction is illustratively in a first one of the registers, and the first register is identified by at least one operand of the first move instruction. The first storage location in such an embodiment is illustratively identified by an address contained in the one or more additional operands of the first move instruction, and the second storage location is illustratively identified as a function of the address and an offset contained in a second one of the registers.

The host processor 102 in executing the first move instruction in the present embodiment is more particularly configured to store the data from the first register in the first storage location identified by the address, and to store the data from the first register in the second storage location identified as a function of the address and the offset. By way of example, the second storage location is illustratively identified as a sum of the address and the offset contained in the second register.

As mentioned previously, the instruction set of the host processor 102 further comprises a second move instruction. The second move instruction in some embodiments is illustratively configured for moving the data from the multiple distinct storage locations to another storage location, where the other storage location is identified by at least one operand of the second move instruction. The host processor 102, in executing the second move instruction, is configured to retrieve the data from the first storage location, to retrieve the data from the second storage location, and to compare the retrieved data from the first storage location with the retrieved data from the second storage location.

Responsive to the retrieved data from the first storage location being the same as the retrieved data from the second storage location, the host processor 102 stores the data in the other storage location.

Responsive to the retrieved data from the first storage location being different than the retrieved data from the second storage location, the host processor 102 generates a notification indicative of the difference. For example, the host processor 102 can generate the notification in the form of an application level exception.

The other storage location illustratively comprises a particular one of the registers identified by at least one operand of the second move instruction.

As indicated above, the registers of the host processor 102 in some embodiments include what are referred to herein as "hidden registers." Such hidden registers are not visible to an application programmer, and are illustratively mapped in and out of the visible register space using micro-operations that are also not visible to the application programmer. The hidden registers are therefore not part of the registers that are visible to applications executing on the host processor 102.

In some embodiments in which the host processor 102 comprises hidden registers, retrieving the data from the first and second storage locations comprises loading the data from the first storage location into a first hidden register of the host processor 102, and loading the data from the second storage location into a second hidden register of the host processor 102. Comparing the retrieved data from the first storage location with the retrieved data from the second storage location in such an embodiment illustratively comprises comparing contents of the first and second hidden registers. It is to be appreciated that other embodiments need not utilize any hidden registers.

The first and second storage locations in some embodiments are in respective distinct memory blocks of at least one of the NVM devices 106 of the system 100. For example, the first and second storage locations can be in respective distinct memory blocks of a particular one of the NVM devices 106, or in respective distinct memory blocks of respective different ones of the NVM devices 106. It is also possible that the first and second storage locations are in respective ones of a first memory block in volatile memory 104 and a second memory block in one of the NVM devices 106. Other types of storage locations involving one or more memory devices or other storage devices of system 100 can be used in conjunction with execution of the first and second move instructions.

The first and second storage locations in some embodiments are in respective distinct fault domains of the system. Such an arrangement can be configured to ensure that data moved from a register to memory using the first move instruction can be reliably moved from memory to a register using the second move instruction even in the presence of a failure in one of the fault domains.

The first and second move instructions described above in some embodiments more particularly comprise what are referred to as "storage specific CPU instructions." Such instructions may additionally or alternatively be viewed as performing respective write and read functionality.

These and other particular move instructions and their respective features and functionality as described above are presented by way of illustrative example only, and can be varied in other embodiments. Such features and functionality should therefore not be construed as limiting in any way.

Additional details regarding example process operations associated with resilient data move instructions in illustrative embodiments will be provided below in conjunction with the flow diagrams of FIGS. 2A and 2B and the additional illustrative embodiments shown in FIGS. 3, 4A and 4B.

It should also be noted that system 100 may comprise additional or alternative components relative to those explicitly shown in FIG. 1. For example, various types of networks can be included in system 100, possibly comprising one or more PCIe switches or other types of switch fabrics arranged between the host processor 102 and the NVM devices 106. Also, different numbers, types and arrangements of host processors and storage devices can be used in other embodiments.

In some embodiments, the NVM devices 106 are part of a larger storage platform. For example, the NVM devices 106 can be part of a "fast tier" or other type of front-end storage tier of a multi-tier storage system. Such a storage system can further comprise a "capacity tier" or other back-end storage tier, possibly comprising one or more object stores, including cloud-based object stores such as Amazon Simple Storage Service (S3), Google Cloud Platform Cloud Storage, and Microsoft Azure Blob Storage. Accordingly, cloud-based implementations of the storage system are possible.

A given storage platform that includes NVM devices 106 can comprise any of a variety of different types of storage including network-attached storage (NAS), storage area networks (SANs), direct-attached storage (DAS) and distributed DAS, as well as combinations of these and other storage types, including software-defined storage.

Additionally or alternatively, the storage platform can comprise storage arrays such as VNX®, Symmetrix VMAX® and Unity™ storage arrays, commercially available from Dell EMC. Other types of storage products that can be used in implementing a given storage platform in an illustrative embodiment include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, the host processor 102 and possibly other components of the system 100 may be implemented at least in part using processing devices of such processing platforms.

As indicated above, communications between elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, a computer, server or other host device having multiple CPU sockets each with a separate instance of volatile cache memory is considered a type of "host processor" as that term is broadly used herein.

Numerous other types and arrangements of host processors can be incorporated into a higher-level device such as computer, server or other host device. The term "host processor" as used herein is therefore intended to be broadly construed.

The operation of the system 100 will now be described in further detail with reference to the flow diagrams of FIGS. 2A and 2B, which show the operation of respective resilient data move instructions in illustrative embodiments. The processes as illustrated in these figures are suitable for use in the system 100 but are more generally applicable to other types of systems each comprising at least one host processor and one or more storage devices. The particular processes as illustrated in FIGS. 2A and 2B represent illustrative examples of resilient data move instructions executed by a host processor, although it is to be appreciated that alternative data move instructions can be implemented using other processes in other embodiments. The host processor and multiple distinct storage locations referred to in the following description may be viewed as corresponding to host processor 102 and multiple distinct storage locations in at least one of the NVM devices 106 of the system 100.

Referring initially to FIG. 2A, operations performed in executing a first move instruction of the type previously described are shown. The first move instruction in this embodiment can be used, for example, to move data from a register to memory in a particularly resilient manner. The data is illustratively moved from the register to multiple storage locations, potentially in different NVM devices or other types of storage devices. The process as illustrated includes steps 200 through 208.

In step 200, a host processor obtains a first move instruction. For example, the host processor can retrieve the first move instruction from a queue of instructions awaiting execution by the host processor. The queued instructions are illustratively part of one or more application programs.

In step 202, the host processor uses at least one operand of the first move instruction to identify data to be moved to multiple distinct storage locations.

In step 204, the host processor uses one or more additional operands of the first move instruction to identify a first storage location.

In step 206, the host processor uses the first storage location and an offset value to determine a second storage location.

In step 208, the host processor stores the data in the first and second storage locations. This illustratively completes the successful execution of the first move instruction.

In some implementations of the above-described process, the data to be moved by execution of the first move instruction is in a first register identified by at least one operand of the first move instruction in step 202. The first storage location is identified in step 204 by an address contained in the one or more additional operands of the first move instruction, and the second storage location is identified in step 206 as a function of the address and an offset contained in a second register, also referred to herein as an offset register. For example, the second storage location can be identified as a sum of the address and the offset contained in the offset register. Numerous other arrangements are possible in other embodiments.

Referring now to FIG. 2B, operations performed in executing a second move instruction of the type previously described are shown. The second move instruction in this embodiment can be used, for example, to move data from memory to a register in a particularly resilient manner. The data is illustratively moved from multiple storage locations, potentially in different NVM devices or other types of storage devices, to the register. The process as illustrated includes steps 210 through 222.

In step 210, a host processor obtains a second move instruction. For example, the host processor can retrieve the second move instruction from a queue of instructions awaiting execution by the host processor. The second move instruction in some embodiments is assumed to be executed subsequent in time to execution of a corresponding instance of the first move instruction of FIG. 2A. For example, the first and second move instructions may be part of a particular application program.

In step 212, the host processor uses at least one operand of the second move instruction to identify a first storage location.

In step 214, the host processor uses the first storage location and an offset value to determine a second storage location.

In step 216, the host processor retrieves data from the first and second storage locations and performs a comparison of the retrieved data from the first storage location with the retrieved data from the second storage location.

In step 218, the host processor makes a determination as to whether or not the retrieved data is consistent across the first and second storage locations. If the retrieved data from both storage locations is the same, the process moves to step 220, and otherwise moves to step 222 as indicated.

In step 220, the host processor moves the data to another location identified by one or more additional operands of the second move instruction. This illustratively completes the successful execution of the second move instruction.

In step 222, the host processor raises an application level exception to indicate that the comparison performed in step 218 identified an inconsistency between the data retrieved from the first storage location and the data retrieved from the second storage location. Such an inconsistency is indicative of a potential fault or other issue in at least one storage device, or in a portion of such a storage device.

In some implementations of the above-described process, the first storage location is identified in step 212 by an address contained in at least one operand of the second move instruction, and the second storage location is identified in step 214 as a function of the address and an offset contained in an offset register. For example, the second storage location can be identified as a sum of the address and the offset contained in the offset register. The other storage location is identified in step 220 is illustratively another register identified by at least one operand of the second move instruction. In retrieving the data from the first and second storage locations in step 216, the data from the first storage location is illustratively loaded into a first hidden register of the host processor, and the data from the second storage location is illustratively loaded into a second hidden register of the host processor. In such an embodiment, comparing the retrieved data from the first storage location with the retrieved data from the second storage location in step 216 illustratively comprises comparing contents of the first and second hidden registers. Numerous other arrangements are possible in other embodiments. For example, other embodiments need not utilize hidden registers.

The particular processing operations and other system functionality described in conjunction with the flow diagrams of FIGS. 2A and 2B are presented by way of illustrative example only, and should not be construed as limiting the scope of the invention in any way. Alternative embodiments can use other types of processing operations involving a host processor and at least one storage device. For example, the ordering of the process steps may be varied in other embodiments, or certain steps may be performed concurrently with one another rather than serially. Also, one or more of the process steps may be repeated periodically, or multiple instances of the process can be performed in parallel with one another in conjunction with execution of different move instructions involving different storage devices. Accordingly, multiple instances of the process can be active in parallel on the same host processor, but possibly involving different storage devices.

It is to be appreciated that functionality such as that described in conjunction with the flow diagrams of FIGS. 2A and 2B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3, 4A and 4B.

Figure 3:
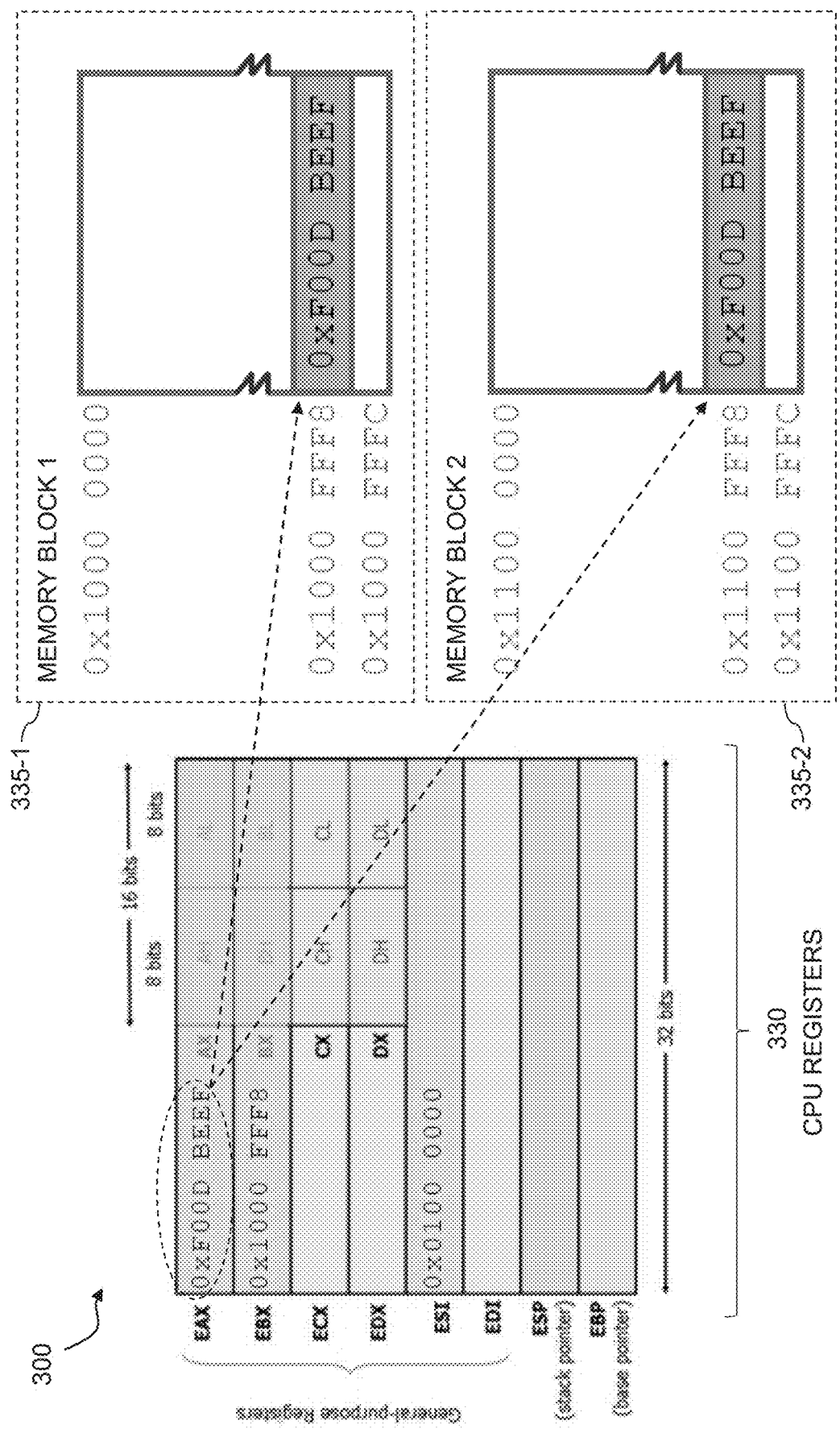
FIG. 3 shows an example of the operation of a resilient data move instruction in an illustrative embodiment.

Referring initially to FIG. 3, a system 300 comprises a host processor that includes CPU registers 330. The host processor that includes the CPU registers 330 is coupled to one or more memory-addressable storage devices comprising first and second memory blocks 335-1 and 335-2, also denoted in the figure as Memory Block 1 and Memory Block 2, respectively. For example, the two distinct memory blocks 335 can be part of a single NVM device or can be located in two different NVM devices. The first memory block 335-1 encompasses an address range from 0x1000 0000 to 0x1000 FFFC and the second memory block 335-2 encompasses an address range from 0x1100 0000 to 0x1100 FFFC.

The CPU registers 330 include a plurality of general-purpose registers, including registers denoted EAX, EBX, ECX, EDX, ESI and EDI. The ESI register is an example of what is also referred to herein as an offset register. The registers EAX, EBX, ECX, EDX are extended 32-bit registers, and include respective 16-bit registers AX, BX, CX and DX, each including respective 8-bit high portions denoted AH, BH, CH and DH and 8-bit low portions denoted AL, BL, CL and DL. The ESI and EDI registers are implemented as 32-bit registers. The CPU registers 330 further comprise a stack pointer register ESP and a base pointer register EBP, also implemented as 32-bit registers.

It is to be appreciated that the particular arrangements of CPU registers 330 and memory blocks 335 illustrated in the FIG. 3 embodiment are presented by way of example only, and can be varied in other embodiments.

In executing a first move instruction of the type described elsewhere herein in the system 300, the host processor obtains the first move instruction, illustratively from an instruction queue that queues instructions for execution by the host processor. The queued instructions are illustratively part of one or more application programs.

The first move instruction is illustratively a "move resilient data" or "movrd" instruction of the form shown in FIG. 4A, which is as follows:

movrd [ebx], eax

As indicated in FIG. 4A, the example move instruction above moves the four bytes in register EAX to the memory location identified by the address contained in EBX, and also moves the four bytes in register EAX to the memory location identified by the address given by the sum of the address contained in EBX and the offset value contained in ESI.

With reference again to FIG. 3, it can be seen that the four bytes in register EAX are 0xF00D BEEF, that the register EBX contains the address 0x1000 FFF8, and that the offset value stored in offset register ESI is 0x0100 0000. Execution of the move instruction in this example will therefore move the data comprising the four bytes 0xF00D BEEF stored in register EAX to the address 0x1000 FFF8 of memory block 335-1 as identified in register EBX, and will also move the same four bytes 0xF00D BEEF to the address 0x1100 FFF8 of memory block 335-2 as identified by EBX+ESI.

After the successful completion of the above-described example move instruction, an application programmer that included the instruction in an application program can be assured that the data has been reliably saved in two locations. A cache flushing step may be utilized in some embodiments to ensure immediate durability.

In the unlikely event that the instruction fails and the application registered a valid handler, an exception will be triggered. If the application has not registered a valid handler, the application will be aborted.

It should be noted that other arrangements of operands can be used in other embodiments. For example, the first operand need not be a register, but could instead directly identify a memory location. As another example, the second operand in other embodiments can identify data to be moved using memory contents or a constant value, instead of a register. Also, the number, type and ordering of the operands of the move instruction can be varied in other embodiments, and multiple operands can be used to identify data to be moved, or to identify multiple locations to which data is to be moved.

In the above example move instruction described in conjunction with FIGS. 3 and 4A, register-to-register moves and direct memory-to-memory moves are considered invalid, although this restriction can be relaxed in other embodiments.

Referring now to FIG. 4B, an example of a second move instruction will now be described. It is again assumed that the host processor obtains the second move instruction from an instruction queue. The second move instruction is illustratively part of the same application program that includes the first move instruction.

The second move instruction is illustratively a "move resilient data" or "movrd" instruction of the form shown in FIG. 4B, which is as follows:

movrd eax, [ebx]

As indicated in FIG. 4B, the example move instruction above loads the four bytes in memory at the address contained in EBX into a first hidden register, and loads the four bytes in memory at the address contained in EBX+ESI into a second hidden register. If the two hidden registers agree, one of the hidden registers is mapped to EAX, and the other is discarded. If the two hidden registers do not agree, an application level exception is raised.

With reference once again to FIG. 3, execution of the example move instruction will load the four bytes 0xF00D BEEF stored at address 0x1000 FFF8 of memory block 335-1 into a first hidden register, and will also load the four bytes 0xF00D BEEF stored at 0x1100 FFF8 of memory block 335-2 into a second hidden register. The contents of the hidden registers are compared, and if they match, the content of one of the hidden registers is mapped to register EAX. In the unlikely event that the contents of the hidden registers do not match, an application level exception is raised. This assumes that the application has previously registered a valid handler. If the application has not registered a valid handler, the application will be aborted.

In the event that the loading from at least one of the hidden registers does not complete in the move instruction of FIG. 4B, this is an error but one that the application programmer will need to explicitly check for. Normal program operation will not be aborted, nor will an exception be generated.

The first and second move instructions as illustrated in FIGS. 4A and 4B may be viewed as examples of what are also referred to herein as storage specific CPU instructions. Other types of move instructions having different types and arrangements of operands can be used in other embodiments.

As indicated previously, such move instructions may be viewed as implementing respective write and read functionality in the corresponding system. The first move instruction of FIG. 4A may therefore be viewed as providing a type of write instruction, and the second move instruction of FIG. 4B may therefore be viewed as providing a type of read instruction. Numerous other arrangements are possible.

It is apparent from the above that illustrative embodiments disclosed herein can provide a number of significant advantages relative to conventional arrangements. For example, one or more embodiments provide resilient data move instructions as part of an instruction set of a host processor.

Exemplary move instructions in some embodiments are illustratively configured to support enhanced data resiliency in a particularly efficient manner. For example, such embodiments can allow a host processor to better exploit the enhanced functionality of advanced PMEM and SCM devices.

The disclosed techniques can be used with any type of storage devices, including volatile memory and persistent memory.

Resilient data move instructions as described herein provide hardware assistance to facilitate storage resilience in a particularly convenient manner. In some embodiments, after a few minor setup steps, such as loading an offset value, registering an exception handler, and implementing checks for soft errors, applications can perform resilient data moves using single instructions.

It is to be appreciated that the particular advantages described above are associated with particular illustrative embodiments and need not be present in other embodiments. Also, the particular types of storage system features and functionality as illustrated in the drawings and described above are exemplary only, and numerous other arrangements may be used in other embodiments.

It was noted above that portions of a storage system or an associated information processing system as disclosed herein may be implemented using one or more processing platforms. Illustrative embodiments of such platforms will now be described in greater detail. These and other processing platforms may be used to implement at least portions of other storage systems or information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within a storage system or an associated information processing system. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of a storage system or an associated information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a CPU, a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of an information processing system over any type of network or other communication media.

As indicated previously, components of a storage system or an associated information processing system as disclosed herein can be implemented at least in part in the form of one or more software programs stored in memory and executed by a processor of a processing device. For example, at least portions of the functionality of host processor 102 and NVM devices 106 as described herein are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of different types of information processing systems, utilizing various arrangements of host processors, storage devices, non-volatile and volatile memories, memory controllers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system comprising:
a host processor; and
at least one storage device coupled to the host processor;
the host processor being configured to execute instructions of an instruction set, the instruction set comprising a first move instruction for moving data identified by at least one operand of the first move instruction into each of multiple distinct storage locations, the first move instruction being configured to direct movement of data identified by the at least one operand of the first move instruction into each of the multiple distinct storage locations;
wherein the host processor in executing the first move instruction is configured:
to store the data in a first one of the storage locations identified by one or more additional operands of the first move instruction; and
to store the data in a second one of the storage locations identified based at least in part on the first storage location.

2. The system of claim 1 wherein the host processor comprises a plurality of registers, and wherein the data to be moved by execution of the first move instruction is in a first one of the registers, the first register being identified by at least one operand of the first move instruction.

3. The system of claim 2 wherein the first storage location is identified by an address contained in the one or more additional operands of the first move instruction.

4. The system of claim 3 wherein the second storage location is identified as a function of the address and an offset contained in a second one of the registers.

5. The system of claim 4 wherein the host processor in executing the first move instruction is configured:
to store the data from the first register in the first storage location identified by the address; and
to store the data from the first register in the second storage location identified as a function of the address and the offset.

6. The system of claim 4 wherein the second storage location is identified as a sum of the address and the offset contained in the second register.

7. The system of claim 1 wherein the instruction set further comprises a second move instruction for moving the data from the multiple distinct storage locations to another storage location;
the other storage location being identified by at least one operand of the second move instruction;
wherein the host processor in executing the second move instruction is configured:
to retrieve the data from the first storage location;

to retrieve the data from the second storage location;
compare the retrieved data from the first storage location with the retrieved data from the second storage location;
responsive to the retrieved data from the first storage location being the same as the retrieved data from the second storage location, to store the data in the other storage location; and
responsive to the retrieved data from the first storage location being different than the retrieved data from the second storage location, to generate a notification indicative of the difference.

8. The system of claim 7 wherein the host processor comprises a plurality of registers, and wherein the other storage location comprises a particular one of the registers identified by at least one operand of the second move instruction.

9. The system of claim 7 wherein retrieving the data from the first and second storage locations comprises:
loading the data from the first storage location into a first hidden register of the host processor; and
loading the data from the second storage location into a second hidden register of the host processor.

10. The system of claim 9 wherein comparing the retrieved data from the first storage location with the retrieved data from the second storage location comprises comparing contents of the first and second hidden registers.

11. The system of claim 7 wherein generating a notification indicative of the difference comprises raising an application level exception.

12. The system of claim 1 wherein the first and second storage locations are in one of:
respective distinct memory blocks of at least one volatile memory of the system; and
respective distinct memory blocks of at least one persistent memory of the system.

13. The system of claim 1 wherein the first and second storage locations are in respective ones of a first memory block in a volatile memory of the system and a second memory block in a persistent memory of the system.

14. The system of claim 1 wherein the first and second storage locations are in respective distinct fault domains of the system.

15. A method comprising:
obtaining in a host processor of a system a first move instruction for moving data identified by at least one operand of the first move instruction into each of multiple distinct storage locations, the first move instruction being configured to direct movement of data identified by the at least one operand of the first move instruction into each of the multiple distinct storage locations; and
executing the first move instruction in the host processor;
wherein executing the first move instruction comprises:
storing the data in a first one of the storage locations identified by one or more additional operands of the first move instruction; and
storing the data in a second one of the storage locations identified based at least in part on the first storage location.

16. The method of claim 15 wherein:
the host processor comprises a plurality of registers, and the data to be moved by execution of the first move instruction is in a first one of the registers;
the first register being identified by at least one operand of the first move instruction;
the first storage location being identified by an address contained in the one or more additional operands of the first move instruction; and
the second storage location being identified as a function of the address and an offset contained in a second one of the registers.

17. The method of claim 15 further comprising:
obtaining in the host processor a second move instruction for moving the data from the multiple distinct storage locations to another storage location; and
executing the second move instruction in the host processor;
the other storage location being identified by at least one operand of the second move instruction;
wherein executing the second move instruction comprises:
retrieving the data from the first storage location;
retrieving the data from the second storage location;
comparing the retrieved data from the first storage location with the retrieved data from the second storage location;
responsive to the retrieved data from the first storage location being the same as the retrieved data from the second storage location, storing the data in the other storage location; and
responsive to the retrieved data from the first storage location being different than the retrieved data from the second storage location, generating a notification indicative of the difference.

18. A computer program product comprising a non-transitory processor-readable storage medium having stored therein program code of one or more software programs, wherein the program code, when executed by a system comprising a host processor and at least one storage device coupled to the host processor, causes the system:
to obtain a first move instruction for moving data identified by at least one operand of the first move instruction into each of multiple distinct storage locations, the first move instruction being configured to direct movement of data identified by the at least one operand of the first move instruction into each of the multiple distinct storage locations; and
to execute the first move instruction in the host processor;
wherein executing the first move instruction comprises:
storing the data in a first one of the storage locations identified by one or more additional operands of the first move instruction; and
storing the data in a second one of the storage locations identified based at least in part on the first storage location.

19. The computer program product of claim 18 wherein:
the host processor comprises a plurality of registers, and the data to be moved by execution of the first move instruction is in a first one of the registers;
the first register being identified by at least one operand of the first move instruction;
the first storage location being identified by an address contained in the one or more additional operands of the first move instruction; and
the second storage location being identified as a function of the address and an offset contained in a second one of the registers.

20. The computer program product of claim 18 wherein the program code when executed by the system further causes the system:

to obtain in the host processor a second move instruction for moving the data from the multiple distinct storage locations to another storage location; and to execute the second move instruction in the host processor;

the other storage location being identified by at least one operand of the second move instruction;

wherein executing the second move instruction comprises:

retrieving the data from the first storage location;

retrieving the data from the second storage location;

comparing the retrieved data from the first storage location with the retrieved data from the second storage location;

responsive to the retrieved data from the first storage location being the same as the retrieved data from the second storage location, storing the data in the other storage location; and responsive to the retrieved data from the first storage location being different than the retrieved data from the second storage location, generating a notification indicative of the difference.

* * * * *